(12) United States Patent
Carey et al.

(10) Patent No.: US 9,076,467 B2
(45) Date of Patent: Jul. 7, 2015

(54) CURRENT-PERPENDICULAR-TO-THE-PLANE (CPP) MAGNETORESISTIVE SENSOR WITH MULTILAYER REFERENCE LAYER INCLUDING A CRYSTALLINE COFEX LAYER AND A HEUSLER ALLOY LAYER

(71) Applicant: HGST Netherlands B.V., Amsterdam (NL)

(72) Inventors: Matthew J. Carey, San Jose, CA (US); Jeffrey R. Childress, San Jose, CA (US); Young-suk Choi, Los Gatos, CA (US); John Creighton Read, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 24 days.

(21) Appl. No.: 13/933,321

(22) Filed: Jul. 2, 2013

(65) Prior Publication Data

US 2015/0010780 A1 Jan. 8, 2015

(51) Int. Cl.
*G11B 5/39* (2006.01)
(52) U.S. Cl.
CPC ...... *G11B 5/3929* (2013.01); *G11B 2005/3996* (2013.01); *Y10T 428/1129* (2015.01)
(58) Field of Classification Search
CPC ............. G11B 5/39–5/3993; G11B 2005/3996
USPC .................................................. 360/313–328
See application file for complete search history.

(56) References Cited

U.S. PATENT DOCUMENTS

| | | | |
|---|---|---|---|
| 6,870,711 B1 | 3/2005 | Zhao et al. | |
| 7,411,765 B2 | 8/2008 | Childress et al. | |
| 8,320,080 B1 | 11/2012 | Braganca et al. | |
| 2006/0044705 A1* | 3/2006 | Hasegawa et al. | 360/324.11 |
| 2009/0027813 A1* | 1/2009 | Carey et al. | 360/324.12 |
| 2009/0091864 A1* | 4/2009 | Carey et al. | 360/324.11 |
| 2009/0284873 A1* | 11/2009 | Gill | 360/314 |
| 2009/0323228 A1* | 12/2009 | Carey et al. | 360/319 |
| 2011/0026168 A1* | 2/2011 | Carey et al. | 360/324.11 |
| 2012/0225322 A1 | 9/2012 | Han et al. | |
| 2012/0295131 A1 | 11/2012 | He et al. | |
| 2013/0236639 A1* | 9/2013 | Carey et al. | 427/130 |
| 2013/0236744 A1* | 9/2013 | Brinkman et al. | 428/811.2 |

* cited by examiner

*Primary Examiner* — Craig A. Renner
(74) *Attorney, Agent, or Firm* — Thomas R. Berthold

(57) ABSTRACT

A current-perpendicular-to-the-plane giant magnetoresistance (CPP-GMR) has a multilayer reference layer containing a Heusler alloy. The multilayer reference layer includes a crystalline non-Heusler alloy ferromagnetic layer on an antiferromagnetic layer, a Heusler alloy layer, and an intermediate crystalline non-Heusler alloy of the form CoFeX, where X is one or more of Ge, Al, Si and Ga, located between the non-Heusler alloy layer and the Heusler alloy layer. The CoFeX alloy layer has a composition $(Co_yFe_{(100-y)})_zX_{(100-z)}$ where y is between about 10 and 90 atomic percent, and z is between about 50 and 90 atomic percent. The CoFeX alloy layer induces very strong pinning, which greatly lessens the likelihood of magnetic instability by the spin polarized electron flow from the free layer to the reference layer.

12 Claims, 7 Drawing Sheets

CURRENT-PERPENDICULAR-TO-THE-PLANE (CPP) MAGNETORESISTIVE SENSOR WITH MULTILAYER REFERENCE LAYER INCLUDING A CRYSTALLINE COFEX LAYER AND A HEUSLER ALLOY LAYER

BACKGROUND OF THE INVENTION

1. Field of the Invention

The invention relates generally to a current-perpendicular-to-the-plane (CPP) magnetoresistive sensor that operates with the sense current directed perpendicularly to the planes of the layers making up the sensor stack, and more particularly to a CPP sensor with an improved ferromagnetic reference layer.

2. Background of the Invention

One type of conventional magnetoresistive (MR) sensor used as the read head in magnetic recording disk drives is a "spin-valve" sensor based on the giant magnetoresistance (GMR) effect. A GMR spin-valve sensor has a stack of layers that includes two ferromagnetic layers separated by a nonmagnetic electrically conductive spacer layer, which is typically formed of Cu or Ag. One ferromagnetic layer, typically called the "reference" layer, has its magnetization direction fixed, such as by being pinned by exchange coupling with an adjacent antiferromagnetic layer, and the other ferromagnetic layer, typically called the "free" layer, has its magnetization direction free to rotate in the presence of an external magnetic field. With a sense current applied to the sensor, the rotation of the free-layer magnetization relative to the fixed-layer magnetization is detectable as a change in electrical resistance. If the sense current is directed perpendicularly through the planes of the layers in the sensor stack, the sensor is referred to as current-perpendicular-to-the-plane (CPP) sensor.

In a magnetic recording disk drive CPP-GMR read sensor or head, the magnetization of the fixed or pinned layer is generally perpendicular to the plane of the disk, and the magnetization of the free layer is generally parallel to the plane of the disk in the absence of an external magnetic field. When exposed to an external magnetic field from the recorded data on the disk, the free-layer magnetization will rotate, causing a change in electrical resistance.

The reference ferromagnetic layer in a CPP-GMR sensor used in read heads may be a single pinned layer (sometimes called a simple pinned layer) or part of an antiparallel (AP) pinned structure. The AP-pinned structure has first (AP1) and second (AP2) ferromagnetic layers separated by a nonmagnetic antiparallel coupling (APC) layer with the magnetization directions of the two AP-pinned ferromagnetic layers oriented substantially antiparallel. The AP2 layer, which is in contact with the nonmagnetic APC layer on one side and the sensor's electrically conductive spacer layer on the other side, is the reference layer. The AP1 layer, which is typically in contact with an antiferromagnetic layer, such as IrMn, on one side and the nonmagnetic APC layer on the other side, is typically referred to as the pinned layer. The AP-pinned structure minimizes magnetostatic coupling between the reference layer and the CPP-SV free ferromagnetic layer. The AP-pinned structure, also called a "laminated" pinned layer, and sometimes called a synthetic antiferromagnet (SAF), is described in U.S. Pat. No. 5,465,185.

The materials making up the free layer and the reference layer (either the simple pinned layer or the AP2 layer in an AP-pinned structure) are typically crystalline alloys of CoFe or NiFe. Heusler alloys, which are chemically ordered alloys like $Co_2MnX$ (where X is one or more of Ge, Si, Sn, Ga or Al) and $Co_2FeZ$ (where Z is one or more of Ge, Si, Al, Sn or Ga), are known to have high spin-polarization and result in an enhanced magnetoresistance and are thus desirable ferromagnetic materials to use in one or both of the reference layer and free layer. In the reference layer, Heusler alloys are usually deposited directly on a layer of a crystalline ferromagnetic material, such as Co or CoFe, or on an amorphous ferromagnetic material. Heusler alloys typically require significant post-deposition annealing to achieve chemical ordering and high spin-polarization. However, while Heusler alloy reference layers provide high spin-polarization, they also display low magnetic damping, which makes them particularly subject to spin torque instability due to the spin polarized electrons from the free layer when the sensor is under voltage bias. Thus sensors with Heusler alloy reference layers are especially prone to suffer reduced magnetic stability and reduced sensitivity. This requires further enhanced pinning strength for the Heusler-based reference layers compared to crystalline CoFe alloy reference layers with lower spin polarization.

What is needed is a CPP-GMR sensor with a reference layer that has a Heusler alloy for high spin-polarization and improved magnetoresistance, but that is not prone to magnetic instability and reduced sensitivity with increased voltage bias.

SUMMARY OF THE INVENTION

Embodiments of the invention relate to a CPP-GMR sensor with a multilayer reference layer containing a Heusler alloy. The multilayer reference layer, which may be a simple pinned layer or the AP2 layer of an AP-pinned structure, is a multilayer that includes a Heusler alloy. The multilayer reference layer includes a crystalline non-Heusler alloy ferromagnetic layer on either an antiferromagnetic layer (in a simple pinned structure) or an APC layer (in an AP-pinned structure), a Heusler alloy layer, and an intermediate crystalline non-Heusler alloy of the form CoFeX, where X is one or more of Ge, Al, Si, Sn and Ga, located between the non-Heusler alloy layer and the Heusler alloy layer. The CoFeX alloy layer has a composition $(Co_yFe_{(100-y)})_zX_{(100-z)}$ where X is one or more of Ge, Al, Si and Ga, y is between about 10 and 90 atomic percent and preferably between about 45 and 55 atomic percent, and z is between about 50 and 90 atomic percent and preferably between about 60 and 80 atomic percent. The CoFeX alloy layer induces very strong pinning, which greatly lessens the likelihood of magnetic instability by the spin polarized electron flow from the free layer to the reference.

For a fuller understanding of the nature and advantages of the present invention, reference should be made to the following detailed description taken together with the accompanying figures.

DETAILED DESCRIPTION OF THE INVENTION

Figure 1:
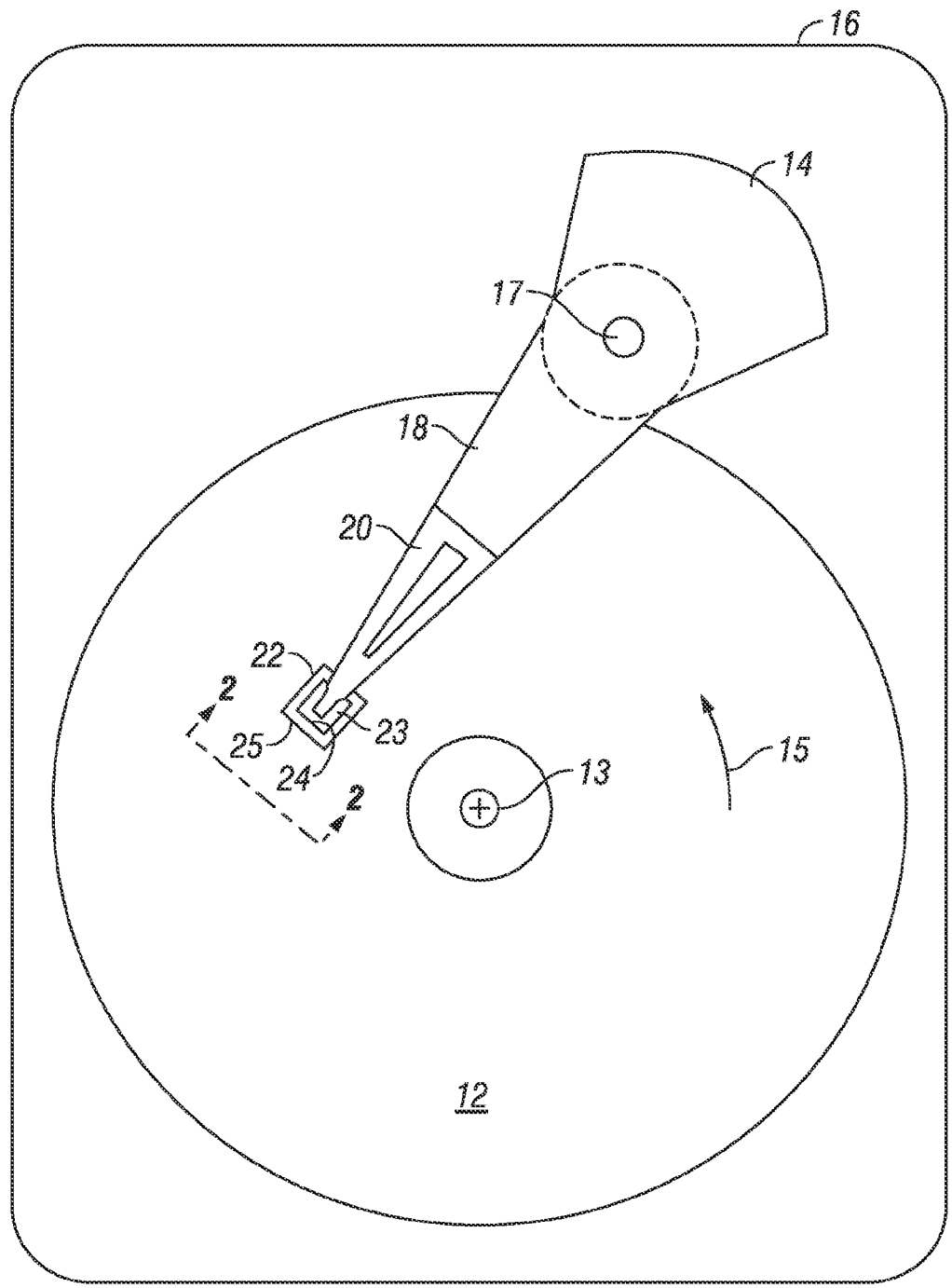
FIG. 1 is a schematic top view of a conventional magnetic recording hard disk drive with the cover removed.

The CPP magnetoresistive (MR) sensor described in this application may be used in a magnetic recording disk drive, the operation of which will be briefly described with reference to FIGS. 1-3. FIG. 1 is a block diagram of a conventional magnetic recording hard disk drive. The disk drive includes a magnetic recording disk 12 and a rotary voice coil motor (VCM) actuator 14 supported on a disk drive housing or base 16. The disk 12 has a center of rotation 13 and is rotated in direction 15 by a spindle motor (not shown) mounted to base 16. The actuator 14 pivots about axis 17 and includes a rigid actuator arm 18. A generally flexible suspension 20 includes a flexure element 23 and is attached to the end of arm 18. A head carrier or air-bearing slider 22 is attached to the flexure 23. A magnetic recording read/write head 24 is formed on the trailing surface 25 of slider 22. The flexure 23 and suspension 20 enable the slider to "pitch" and "roll" on an air-bearing generated by the rotating disk 12. Typically, there are multiple disks stacked on a hub that is rotated by the spindle motor, with a separate slider and read/write head associated with each disk surface.

Figure 2:
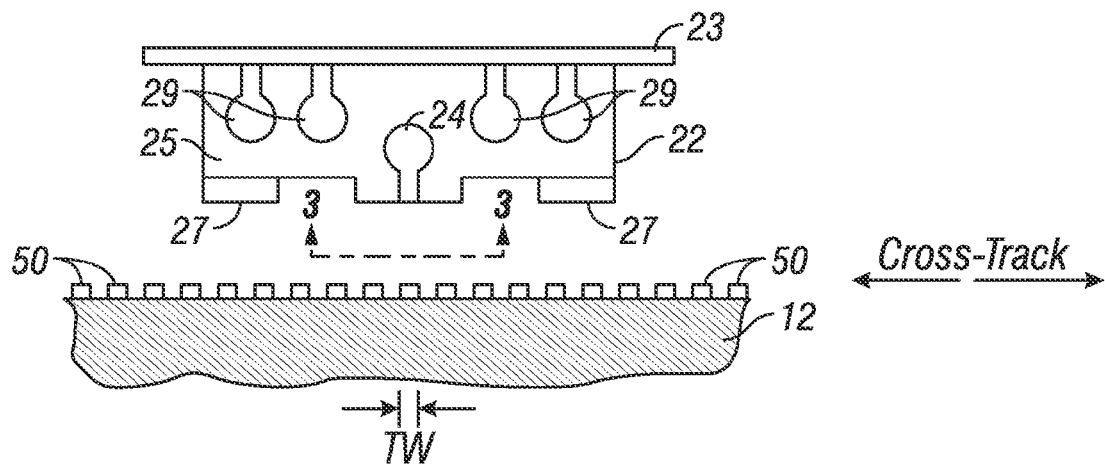
FIG. 2 is an enlarged end view of the slider and a section of the disk taken in the direction 2-2 in FIG. 1.

FIG. 2 is an enlarged end view of the slider 22 and a section of the disk 12 taken in the direction 2-2 in FIG. 1. The slider 22 is attached to flexure 23 and has an air-bearing surface (ABS) 27 facing the disk 12 and a trailing surface 25 generally perpendicular to the ABS. The ABS 27 causes the airflow from the rotating disk 12 to generate a bearing of air that supports the slider 22 in very close proximity to or near contact with the surface of disk 12. The read/write head 24 is formed on the trailing surface 25 and is connected to the disk drive read/write electronics by electrical connection to terminal pads 29 on the trailing surface 25. As shown in the sectional view of FIG. 2, the disk 12 is a patterned-media disk with discrete data tracks 50 spaced-apart in the cross-track direction, one of which is shown as being aligned with read/write head 24. The discrete data tracks 50 have a track width TW in the cross-track direction and may be formed of continuous magnetizable material in the circumferential direction, in which case the patterned-media disk 12 is referred to as a discrete-track-media (DTM) disk. Alternatively, the data tracks 50 may contain discrete data islands spaced-apart along the tracks, in which case the patterned-media disk 12 is referred to as a bit-patterned-media (BPM) disk. The disk 12 may also be a conventional continuous-media (CM) disk wherein the recording layer is not patterned, but is a continuous layer of recording material. In a CM disk the concentric data tracks with track width TW are created when the write head writes on the continuous recording layer.

Figure 3:
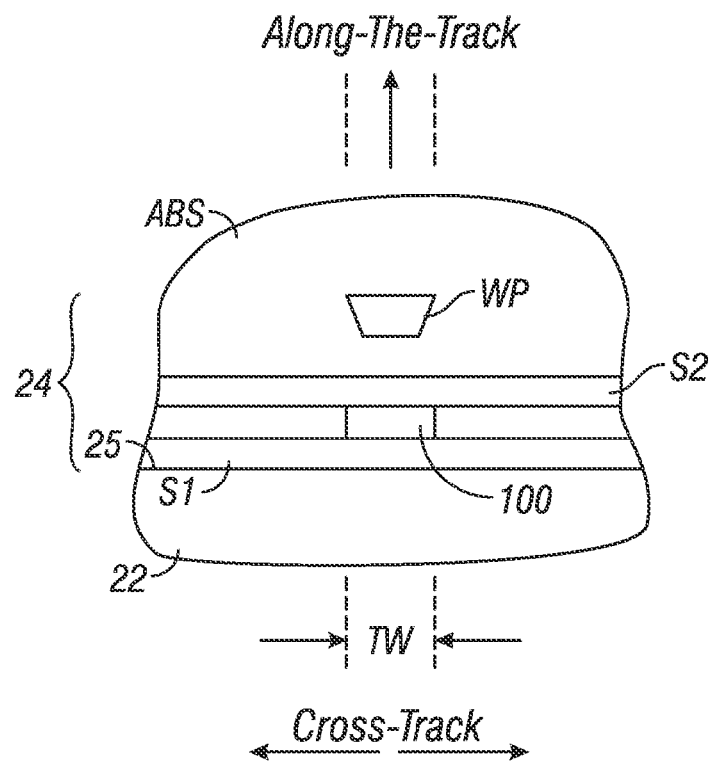
FIG. 3 is a view in the direction 3-3 of FIG. 2 and shows the ends of the read/write head as viewed from the disk.

FIG. 3 is a view in the direction 3-3 of FIG. 2 and shows the ends of read/write head 24 as viewed from the disk 12. The read/write head 24 is a series of thin films deposited and lithographically patterned on the trailing surface 25 of slider 22. The write head includes a perpendicular magnetic write pole (WP) and may also include trailing and/or side shields (not shown). The CPP MR sensor or read head 100 is located between two magnetic shields S1 and S2. The shields S1, S2 are formed of magnetically permeable material and are electrically conductive so they can function as the electrical leads to the read head 100. The shields function to shield the read head 100 from recorded data bits that are neighboring the data bit being read. Separate electrical leads may also be used, in which case the read head 100 is formed in contact with layers of electrically conducting lead material, such as tantalum, gold, or copper, that are in contact with the shields S1, S2. FIG. 3 is not to scale because of the difficulty in showing very small dimensions. Typically each shield S1, S2 is several microns thick in the along-the-track direction, as compared to the total thickness of the read head 100 in the along-the-track direction, which may be in the range of 20 to 40 nm.

Figure 4:
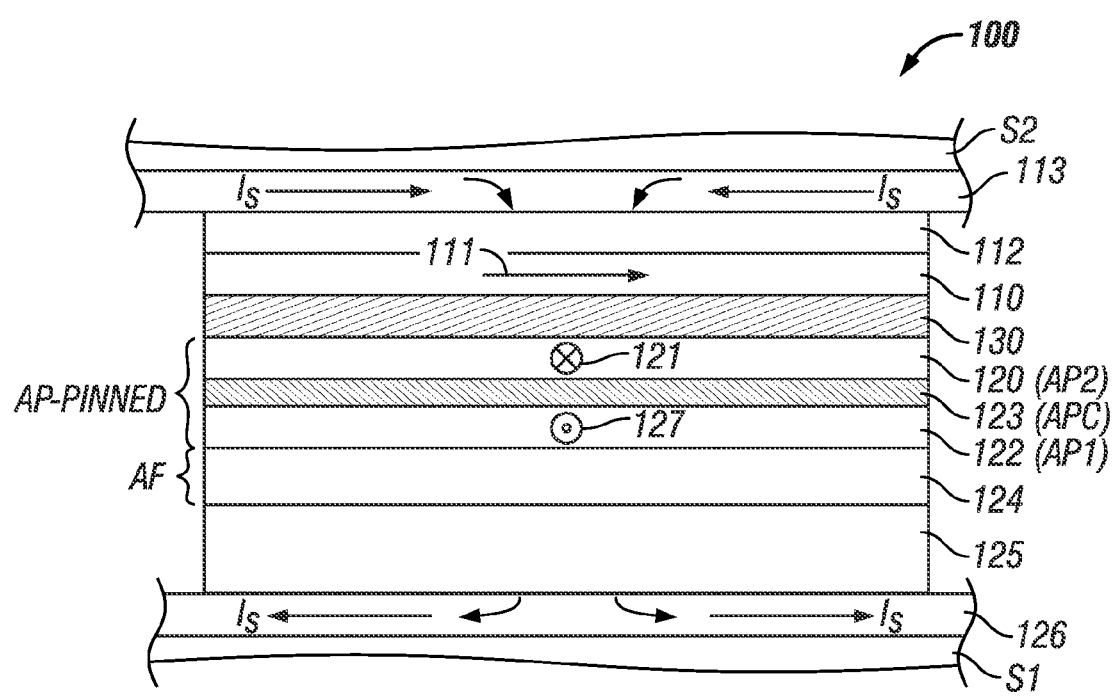
FIG. 4 is a cross-sectional schematic view of a prior art CPP-GMR read head having an antiparallel-pinned (AP-pinned) structure and showing the stack of layers located between the magnetic shield layers.

FIG. 4 is an enlarged sectional view showing the layers making up sensor 100 as would be viewed from the disk. Sensor 100 is a CPP-GMR read head comprising a stack of layers formed between the two magnetic shield layers S1, S2 that are typically electroplated NiFe alloy films. The shields S1, S2 are formed of electrically conductive material and thus may also function as electrical leads for the sense current $I_s$, which is directed generally perpendicularly through the layers in the sensor stack. Alternatively, as depicted in FIG. 4, separate electrically conductive lead layers may be formed between the shields S1, S2 and the sensor stack, like lower lead layer 126 and upper lead layer 113. The lower shield S1 is typically polished by chemical-mechanical polishing (CMP) to provide a smooth substrate for the growth of the sensor stack. This may leave an oxide coating which can be removed with a mild etch just prior to sensor deposition. The sensor layers include an antiparallel (AP) pinned (AP-pinned) structure, a free ferromagnetic layer 110 having a magnetization direction 111 in the absence of an applied magnetic field, and an electrically conductive nonmagnetic spacer layer 130, typically a metal or metal alloy like Cu, Au, Ag or their alloys, between the AP-pinned structure and the free layer 110. A capping layer 112 is located between free layer 110 and the upper shield layer S2. The capping layer 112 provides corrosion protection during processing and magnetically separates the free layer from S2 and may be a single layer or multiple layers of different conductive materials, such as Ru, Ta, NiFe or Cu.

The AP-pinned structure has first (AP1) and second (AP2) ferromagnetic layers separated by a nonmagnetic antiparallel coupling (APC) layer with the magnetization directions of the two AP-pinned ferromagnetic layers oriented substantially antiparallel. The AP2 layer 120, which is in contact with the nonmagnetic APC layer 123 on one side and the sensor's electrically nonmagnetic spacer layer 130 on the other side, is typically referred to as the reference layer 120. The AP1 layer 122, which is typically in contact with an antiferromagnetic layer 124 on one side and the nonmagnetic APC layer 123 on the other side, is typically referred to as the pinned layer. The AP-pinned structure minimizes the net magnetostatic coupling between the reference/pinned layers and the CPP MR free ferromagnetic layer. The AP-pinned structure, also called a "laminated" pinned layer, and sometimes called a synthetic antiferromagnet (SAF), is described in U.S. Pat. No. 5,465,185.

The APC layer 123 is typically Ru, Ir, Rh, Cr, Os or alloys thereof. The AP1 layer is typically formed of crystalline Co, CoFe or NiFe alloys, or a multilayer of these materials, such as a Co/CoFe. The AP2 layer is typically formed of CoFe and includes a high spin polarization material such as Co2MnX or Co2FeZ. The AP1 and AP2 ferromagnetic layers have their respective magnetization directions 127, 121 oriented antiparallel. The AP1 layer 122 is the pinned layer that has a fixed magnetization direction that is pinned by being exchange-coupled to an antiferromagnetic (AF) layer 124 as shown in FIG. 4. The AF layer 124 is typically one of the antiferromagnetic Mn alloys, e.g., PtMn, NiMn, FeMn, IrMn, PdMn, PtPdMn or RhMn, which are known to provide relatively high exchange-bias fields. Typically the Mn alloy material provides lower or little exchange-biasing in the as-deposited state, but when annealed provides stronger exchange-biasing of the pinned ferromagnetic layer 122. A seed layer 125 may be located between the lower shield layer S1 and the antiferromagnetic layer 124 and enhances the growth of the antiferromagnetic layer 124. The seed layer 125 is typically one or more layers of NiFeCr, NiFe, CoFe, CoFeB, CoHf, Ta, Cu or Ru.

The CPP GMR sensor is depicted in FIG. 4 with an AP-pinned structure with AP1 as the pinned layer 122. Alternatively, the CPP GMR sensor may have a single or simple pinned layer. In a simple pinned layer, there is no APC layer 123 and no AP2 layer 120, but only the ferromagnetic layer 122 which is the reference layer. The reference layer 122 would be located between and in contact with the antiferromagnetic layer 124 and the electrically conductive spacer layer 130.

The typical materials used for reference layer 122 are crystalline CoFe or NiFe alloys, or a multilayer of these materials, such as a CoFe/NiFe bilayer. Heusler alloys, i.e., metallic compounds having a Heusler alloy crystal structure like $Co_2MnX$, for example, have been proposed for use as ferromagnetic layers in reference layers for CPP-GMR sensors because they are known to have high spin-polarization and result in an enhanced magnetoresistance. In the case of an AP-pinned structure, a crystalline ferromagnetic material such as Co or CoFe may be located between the Heusler alloy layer and the APC layer by to improve the magnetic coupling between the AP1 and AP2 layers through the APC layer. Similarly, in a simple pinned layer, a layer of crystalline CoFe or Co may be located between the Heusler alloy layer and the IrMn antiferromagnetic layer to improve the coupling of the Heusler alloy layer to the IrMn layer.

However, while Heusler alloy reference layers provide high spin-polarization, they are subject to spin torque instability due to the spin polarized electrons transport when the sensor is under bias. Thus sensors with Heusler alloy reference layers are especially prone to suffer reduced magnetic stability and reduced sensitivity. This requires further enhanced pinning strength for the Heusler-based reference layers compared to crystalline CoFe alloy reference layers with lower spin polarization.

In embodiments of the CPP-GMR sensor of this invention, the reference layer, which may be a simple pinned layer or the AP2 layer of an AP-pinned structure, is a multilayer that includes a Heusler alloy. A chemically disordered body-centered-cubic (bcc) crystalline or chemically B2 ordered non-Heusler alloy of the form CoFeX, where X is one or more of Ge, Al, Si, Sn and Ga, is located between the pinning layer and the Heusler alloy layer. The CoFeX layer induces very strong pinning in a simple pinned layer and improves the coupling in an AP-pinned structure, which lessens the likelihood of magnetic instability by the spin polarized electron flow from the free layer to the reference layer.

Figure 5:
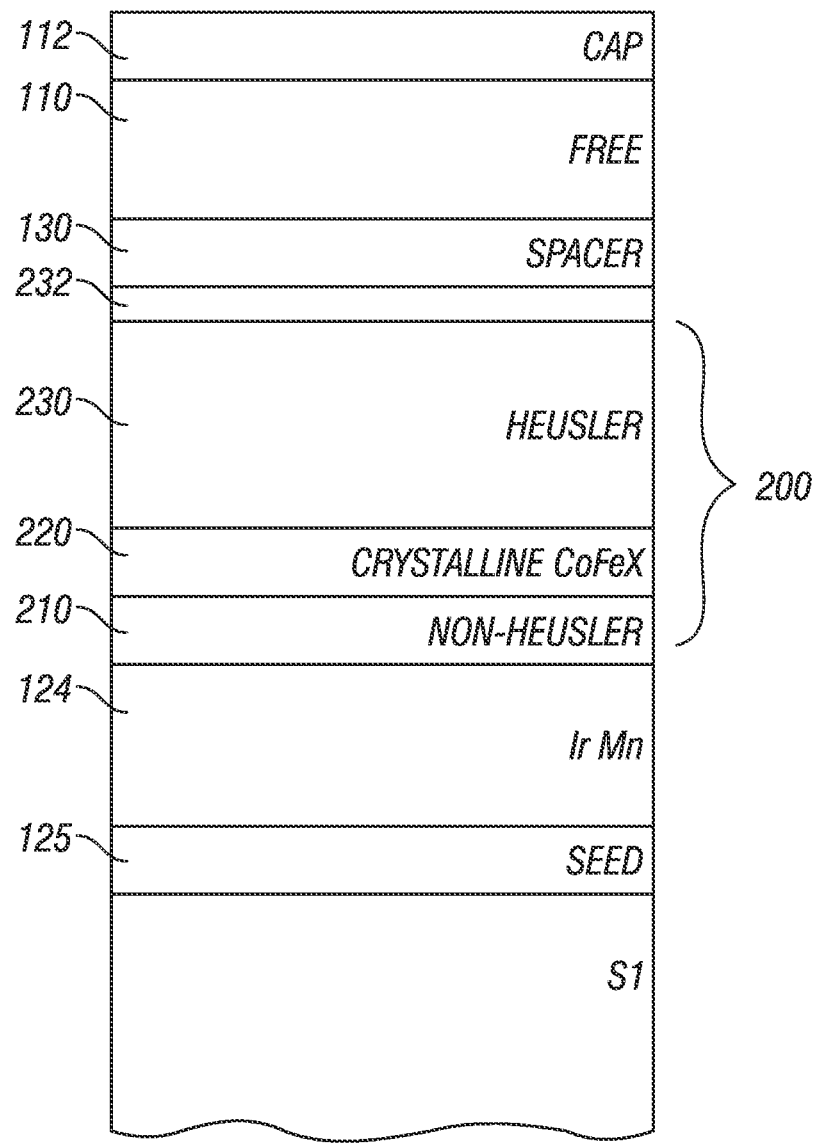
FIG. 5 is a cross-sectional schematic view of the multilayer reference layer structure of an embodiment of the invention.

FIG. 5 is a sectional view showing the multilayer reference layer according to an embodiment of the invention in a simple pinned configuration. The substrate is shield layer S1. A seed layer 125, for example a bilayer of Ru on Ta, is deposited on S1. The antiferromagnetic layer 124 is any conducting antiferromagnetic layer, but is preferably an alloy consisting essentially of IrMn, for example a $Ir_{80}Mn_{20}$ alloy, where the subscripts represent atomic percent. The antiferromagnetic layer 124 has a typical thickness in the range of about 40 to 70 Å. The reference layer 200 is a multilayer reference layer of a crystalline non-Heusler alloy ferromagnetic sublayer 210 on and in contact with the IrMn antiferromagnetic layer 124, a Heusler alloy layer 230 adjacent the nonmagnetic electrically conducting spacer layer 130, and an intermediate crystalline non-Heusler CoFeX alloy layer 220 between the non-Heusler alloy sublayer 210 and the Heusler alloy layer 230. The thickness ranges for the layers in multilayer 200 are 2 to 20 Å for the crystalline non-Heusler alloy ferromagnetic sublayer 210, 10 to 50 Å for the crystalline non-Heusler CoFeX alloy layer 220, and 10 to 60 Å for the Heusler alloy layer 230. An optional interfacial CoFe alloy layer 232, like $Co_2Fe$, with a thickness in the range of about 1 to 10 Å may be located between the Heusler alloy layer 230 and the spacer layer 130. The optional interfacial layer 232 provides a reduction of interlayer magnetic coupling between the reference layer and the free layer.

The crystalline non-Heusler alloy sublayer 210 may be formed of a ferromagnetic alloy comprising a layer or multilayer of one or more of Co, Fe and Ni, but is preferably a single layer of a CoFe alloy, like $Co_2Fe$, with a thickness in the range of about 4 to 20 Å. The non-Heusler alloy sublayer 210 may alternatively be a multilayer, such as a bilayer of Co and CoFe. The Heusler alloy layer 230 is formed of a material selected from $Co_2MnX$ (where X is one or more of Ge, Si, Sn, Ga or Al) and $Co_2FeZ$ (where Z is one or more of Ge, Si, Al, Sn or Ga) with a typical thickness in the range of about 10 to 60 Å.

The CoFeX alloy layer 220 is a chemically disordered body-centered-cubic (bcc) crystalline or chemically B2 ordered non-Heusler alloy having a composition $(Co_y Fe_{(100-y)})_z X_{(100-z)}$ where X is one or more of Ge, Al, Si and Ga, y is between about 10 and 90 atomic percent and preferably between about 45 and 55 atomic percent, and z is between about 50 and 90 atomic percent and preferably between about 60 and 80 atomic percent. The preferred type of this CoFeX material is CoFeGe, which is described in U.S. Pat. No. 7,826,182 B2 for use in CPP-GMR sensors. In one technique for the fabrication of the CPP-GMR sensor with the multilayer reference layer shown in FIG. 5, the layers, including the antiferromagnetic layer 124, the CoFeX alloy layer 220 and the Heusler alloy layer 230, all of which must be annealed, up through and including the free layer 110 and capping layer 112, are deposited sequentially on S1. The material that will make up the Heusler alloy layer 230 is sputter deposited on the CoFeX alloy layer 220. For example, if the Heusler alloy is to be chemically-ordered $Co_2MnSi$, then a single target or multiple targets with Co, Mn and Si are used to sputter deposit a disordered layer containing the proper relative amounts of these elements. Once the Heusler alloy free layer is deposited, sequential deposition is paused, and an in-situ rapid thermal anneal (RTA) is typically carried out to enhance the crystallinity of the Heusler alloy free layer as well as the Heusler alloy in the reference layer. This RTA step can be in the same vacuum chamber or in an attached vacuum chamber and is performed at about 200-400° C. for about 1-15 minutes. Once the RTA process and subsequent cooling is performed, the sequential deposition is resumed up to the capping layer 112. Then a final post-deposition annealing, and subsequent cooling, is performed, after removal from the deposition chamber, in the presence of a magnetic field. This is done at a maximum temperature between about 200-400° C., for example about 280° C., for between about 0.5-50 hours, for example about 12 hours, and induces strong exchange-biasing of the multilayer reference layer 200 with the antiferromagnetic layer 124.

In another technique, two steps of in-situ RTA processes are performed. First an in-situ RTA process can be performed in the vacuum chamber after the deposition of the CoFeX alloy layer 220 and before the deposition of the Heusler alloy layer 230. This annealing is at about 150-300° C. for about 1-30 minutes and results in the microstructural improvement of the antiferromagnetic layer 124 and surface roughness improvement of the CoFeX alloy layer 220. Then the remaining layers up through and including the free layer 110, which may also be a Heusler alloy, are deposited. Then a second in-situ RTA process can be performed at 200-400° C. for about 1-15 minutes. The purpose of the second anneal is to enhance the crystallinity of the Heusler alloy free layer as well as the Heusler alloy in the reference layer. After the full stack has been deposited, a final post-deposition annealing, and subsequent cooling, is performed, either in-situ or after removal from the deposition chamber, in the presence of a magnetic field. This is done at a maximum temperature between about 200-400° C., for example about 280° C., for between about 0.5-50 hours, for example about 12 hours, and induces strong exchange-biasing of the multilayer reference layer 200 with the antiferromagnetic layer 124.

The composition $(Co_yFe_{(100-y)})_zX_{(100-z)}$ (where X is one or more of Ge, Al, Si and Ga, y is between about 10 and 90 atomic percent and z is between about 50 and 90 atomic percent) includes an alloy with a composition $Co_2FeX$, which is a stoichimetric composition ratio of becoming a Heusler alloy if this alloy becomes chemically ordered. However, the CoFeX alloy in this invention is specifically not a Heusler alloy because the annealing is never done at a temperature high enough to make the $Co_2FeX$ chemically ordered, which is at least 500° C.

Figure 6:
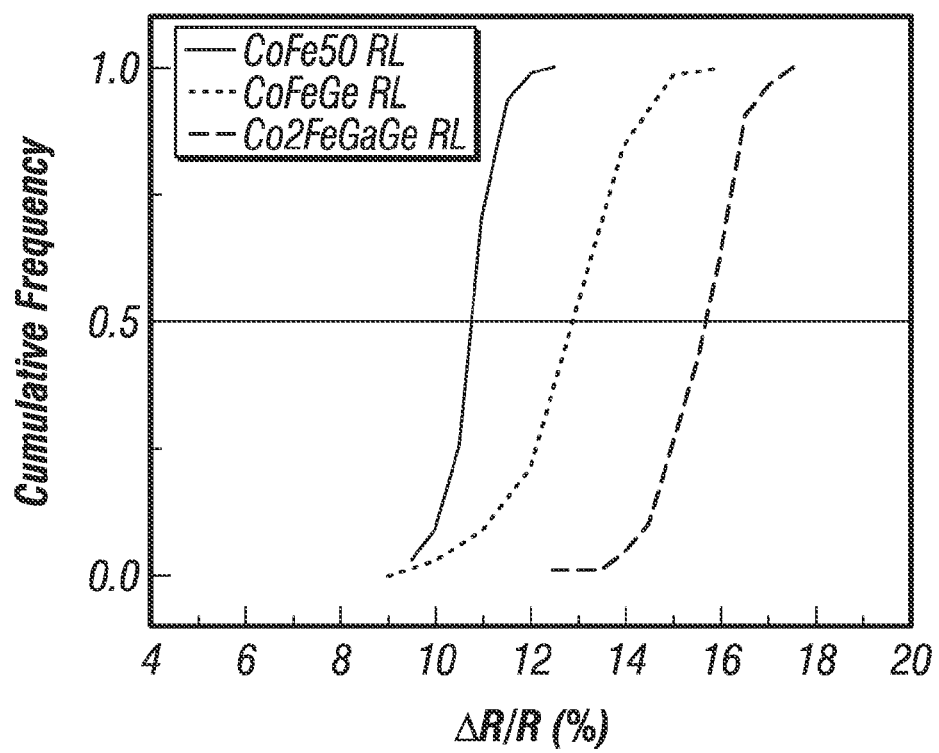
FIG. 6 is a comparison of magnetoresistance (ΔR/R) for sensors with a conventional CoFe$_{50}$ reference layer, a single CoFeGe reference layer, and a single Co$_2$FeGaGe Heusler alloy reference layer.

FIG. 6 is a comparison of magnetoresistance (ΔR/R) for sensors with a conventional $CoFe_{50}$ reference layer, a single CoFeGe reference layer, and a single $Co_2FeGaGe$ Heusler alloy reference layer. A sensor with a single $Co_2FeGaGe$ Heusler alloy reference layer has a much higher magnetoresistance (ΔR/R) than a sensor with a conventional $CoFe_{50}$ reference layer and a sensor with a single CoFeGe reference layer. In the development of embodiments of this invention the (ΔR/R) of sensor samples with a reference layer having a structure of [15 Å $Co_{37.5}Fe_{37.5}Ge_{25}$/13 Å $Co_2FeGaGe$ Heusler alloy/2 Å $Co_2Fe$ interfacial layer] like an embodiment of this invention were measured and found to be substantially the same as for sensor samples with a reference layer of [30 Å $Co_2FeGaGe$ Heusler alloy].

However a single $Co_2FeGaGe$ Heusler alloy reference layer has a low pinning strength. From measurements of pinning strength, it has been shown that a single layer of CoFeGe has a higher pinning strength than both a $CoFe_{50}$ layer and $Co_2FeGaGe$ Heusler alloy, which has the lowest pinning strength.

Figure 7:
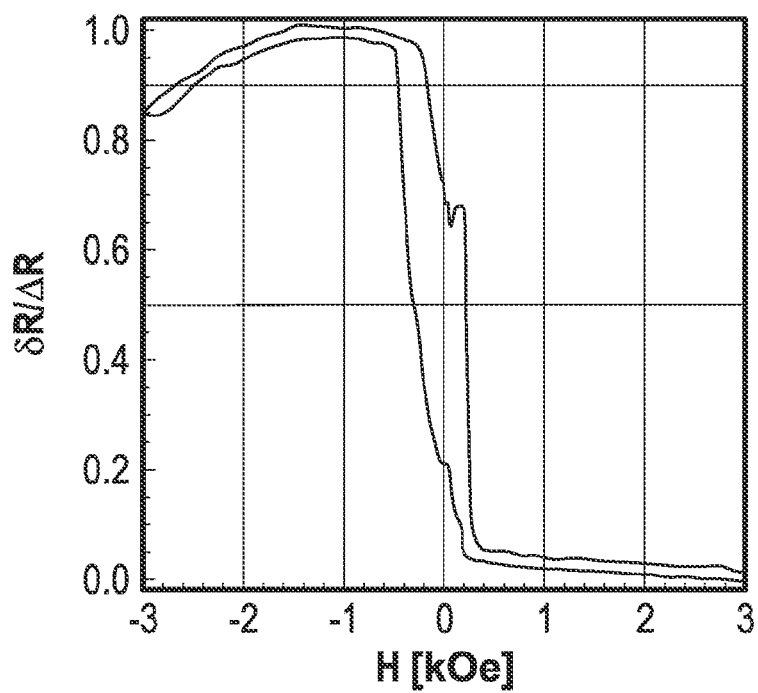
FIG. 7 is a transfer curve, which is a measure of the change in resistance with respect to the external field, for a sensor according to an embodiment of the invention.

Measurements of pinning strength showed that the structure of a [15 Å $Co_{37.5}Fe_{37.5}Ge_{25}$/13 Å $Co_2FeGaGe$ Heusler alloy/2 Å $Co_2Fe$ interfacial layer] like an embodiment of this invention has a pinning strength is comparable to a sensor with a single reference layer of CoFeGe. This is shown in FIG. 7, which is a transfer curve from a 470 nm square sensor, and is measure of the change in resistance with respect to an external magnetic field. FIG. 7 shows that $H_{50}$, which is the pinning strength defined by the loss of antiparallel resistance by half (0.5 in y-axis), is beyond −3 kOe. This pinning strength is comparable to a sensor with a single reference layer of CoFeGe, which results in much stronger pinning compared to a sensor stack with a single reference layer of $Co_2FeGaGe$.

Figure 8:
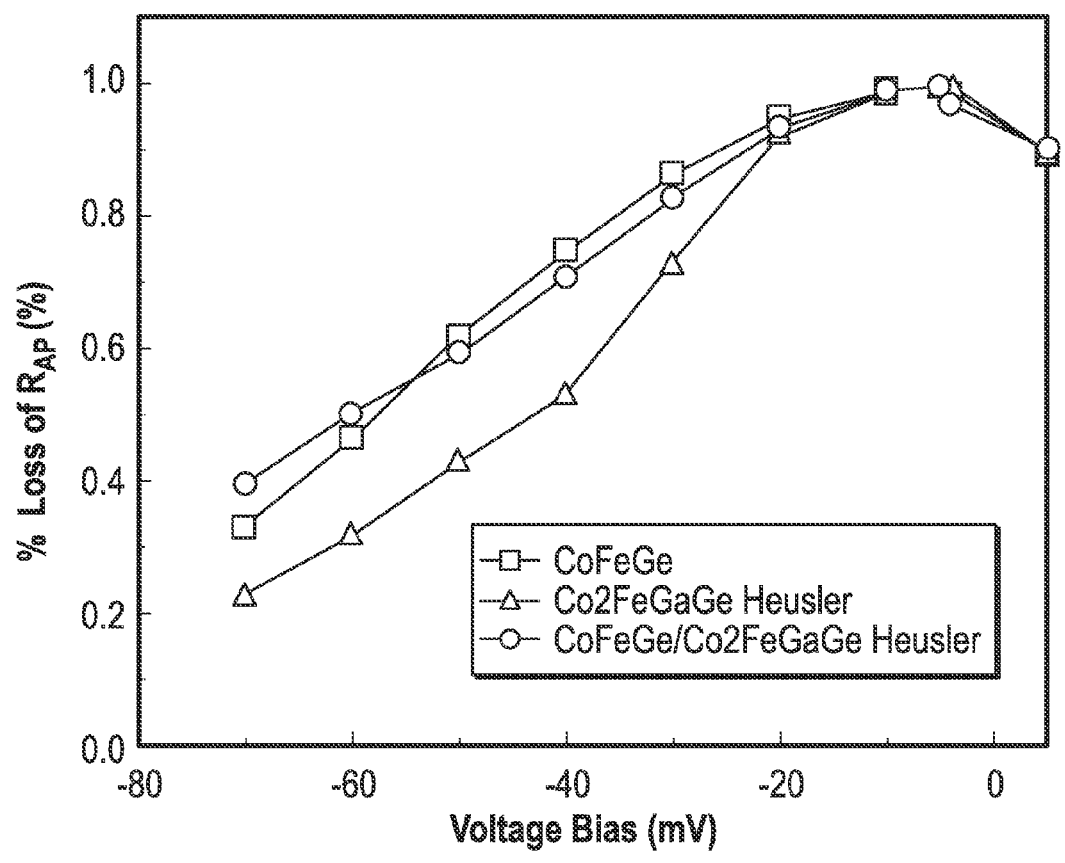
FIG. 8 is a roll-off curve, which measures the loss in resistance of a sensor in the magnetic antiparallel state of the free layer and reference layer, for sensors with three different reference layers, including a sensor according to an embodiment of the invention.

FIG. 8 is a roll-off curve, which measures the loss in resistance in the magnetic antiparallel state ($R_{AP}$), of sensors with three different reference layers. FIG. 8 shows that the sensor with the [15 Å $Co_{37.5}Fe_{37.5}Ge_{25}$/13 Å $Co_2FeGaGe$ Heusler alloy/2 Å $Co_2Fe$ interfacial layer] reference layer is less prone to lose its magnetic stability and sensitivity than the sensor with the [30 Å $Co_2FeGaGe$ Heusler alloy] reference layer. Also the sensor with the [15 Å $Co_{37.5}Fe_{37.5}Ge_{25}$/13 Å $Co_2FeGaGe$ Heusler alloy/2 Å $Co_2Fe$ interfacial layer] reference layer shows a roll-off almost the same as for the sensor with the [30 Å $Co_{37.5}Fe_{37.5}Ge_{25}$] reference layer. Thus the sensor with the crystalline CoFeX alloy/Heusler alloy bilayer reference layer provides high magnetoresistance as well as robustness against magnetic instability.

Figure 9:
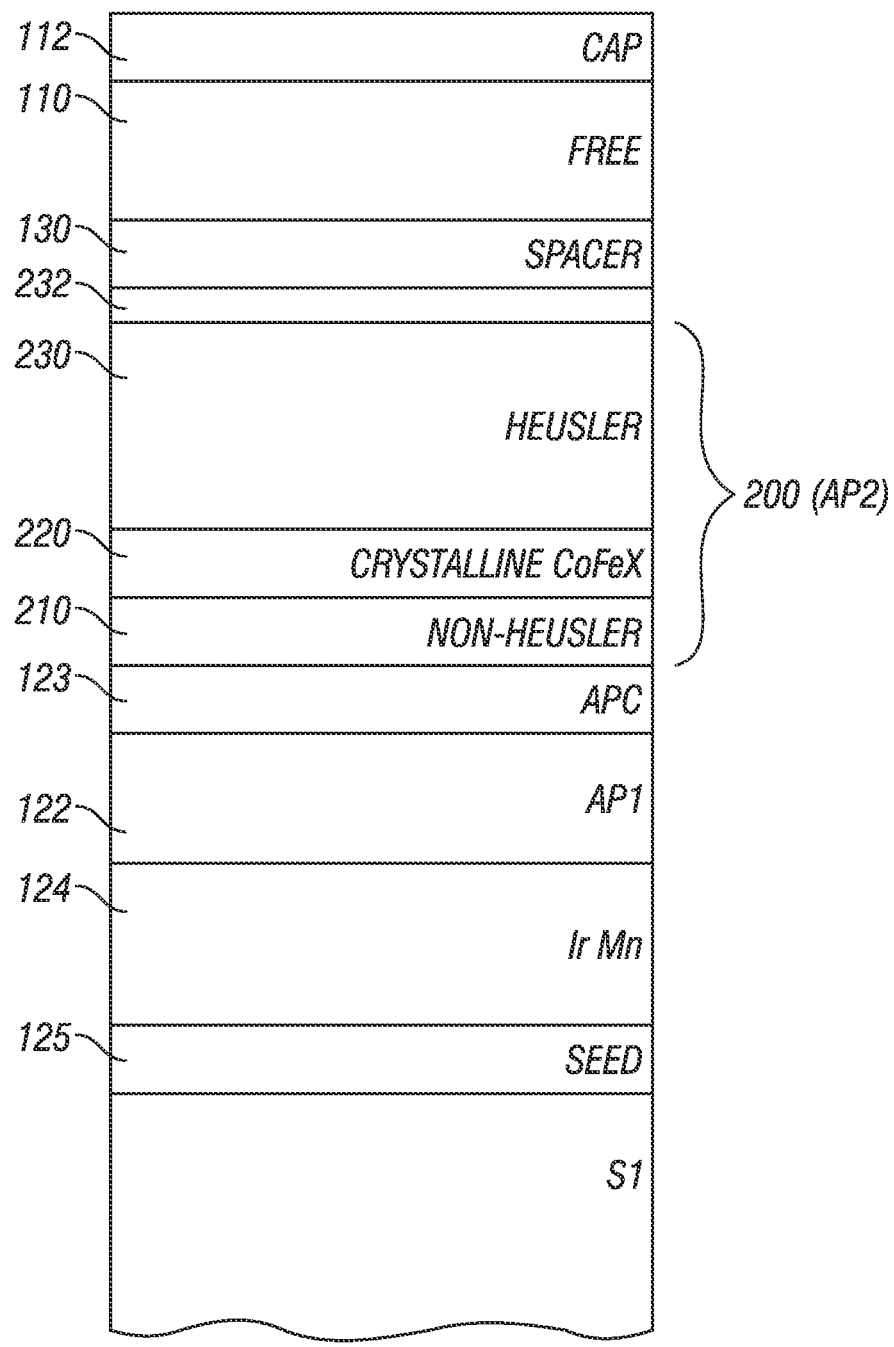
FIG. 9 is a cross-sectional schematic view of the multilayer reference layer according to an embodiment of the invention in an antiparallel (AP) pinned structure.

FIG. 9 is a sectional view showing the multilayer reference layer in an AP-pinned structure. The substrate is shield layer S1. A seed layer 125, for example a bilayer of Ru on Ta, is deposited on S1. The antiferromagnetic layer 124 is any conducting antiferromagnetic layer, but is preferably an alloy consisting essentially of IrMn, for example an $Ir_{80}Mn_{20}$ alloy, where the subscripts represent atomic percent. The antiferromagnetic layer 124 pins the magnetization direction of the AP1 ferromagnetic layer. The reference layer 200 is a multilayer reference layer of a non-Heusler alloy ferromagnetic sublayer 210 on and in contact with the APC layer 123, a Heusler alloy layer 230, the CoFeX alloy layer 220 between the non-Heusler alloy sublayer 210 and the Heusler alloy layer 230, and an optional interfacial layer 232 between the Heusler alloy layer 230 and the nonmagnetic electrically conducting spacer layer 130. The Heusler alloy layer 230 has its magnetization direction oriented antiparallel to the magnetization direction of the AP1 layer.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. A magnetoresistive sensor capable of sensing external magnetic fields when a sense current is applied perpendicular to layer planes in the sensor, the sensor comprising:
   a substrate;
   a multilayer reference layer on the substrate, the multilayer reference layer comprising a non-Heusler alloy ferromagnetic sublayer, a Heusler alloy layer having a fixed in-plane magnetization direction, and a crystalline non-Heusler CoFeX alloy layer between the non-Heusler alloy sublayer and the Heusler alloy layer, said CoFeX alloy having a composition $(Co_yFe_{(100-y)})_zX_{(100-z)}$ where X is one or more of Ge, Al, Si, Sn and Ga, y is greater than or equal to 45 atomic percent and less than or equal to 55 atomic percent, and z is greater than or equal to 60 atomic percent and less than or equal to 80 atomic percent;
   a free layer having an in-plane magnetization direction substantially free to rotate in the presence of an external magnetic field; and
   an electrically conductive spacer layer between the free layer and the multilayer reference layer.

2. The sensor of claim 1 further comprising an antiferromagnetic layer comprising a Mn alloy on the substrate between the substrate and the multilayer reference layer, wherein the non-Heusler alloy ferromagnetic sublayer of the multilayer reference layer is in contact with the Mn alloy, the fixed magnetization direction of the Heusler alloy layer being pinned by the Mn alloy.

3. The sensor of claim 1 wherein the sensor includes an antiparallel (AP) pinned structure comprising a first AP-pinned (AP1) ferromagnetic layer having an in-plane magnetization direction, a second AP-pinned (AP2) ferromagnetic layer having an in-plane magnetization direction substantially antiparallel to the magnetization direction of the AP1 layer, and an AP coupling (APC) layer between and in contact with the AP1 and AP2 layers, wherein the AP2 layer comprises said multilayer reference layer wherein the non-Heusler alloy ferromagnetic sublayer is in contact with the APC layer.

4. The sensor of claim 1 wherein X is Ge.

5. The sensor of claim 1 wherein the non-Heusler alloy sublayer comprises a layer of an alloy consisting of Co and Fe.

6. The sensor of claim 1 wherein the layer of Heusler alloy is formed of a material selected from $Co_2MnX$ where X is one or more of Ge, Si, Sn, Ga and Al and $Co_2FeZ$ where Z is one or more of Ge, Si, Al, Sn and Ga.

7. The sensor of claim 1 further comprising an interfacial layer consisting of Co and Fe between the Heusler alloy layer and the spacer layer.

8. The sensor of claim 1 wherein the sensor is a magnetoresistive read head for reading magnetically recorded data from tracks on a magnetic recording medium, and wherein the substrate is a first shield formed of magnetically permeable material.

9. A current-perpendicular-to-the-plane (CPP) magnetoresistive read head comprising:
a substrate;
an antiferromagnetic layer comprising Mn on the substrate;
a multilayer reference layer on the antiferromagnetic layer, the multilayer reference layer comprising
a non-Heusler alloy ferromagnetic sublayer consisting in contact with the antiferromagnetic layer;
a crystalline non-Heusler CoFeX alloy layer on and in contact with the non-Heusler alloy sublayer, said CoFeX alloy having a composition $(Co_yFe_{(100-y)})_zX_{(100-z)}$ where X is one or more of Ge, Al, Si, Sn and Ga, y is greater than or equal to 45 atomic percent and less than or equal to 55 atomic percent, and z is greater than or equal to 60 atomic percent and less than or equal to 80 atomic percent; and
a Heusler alloy layer on and in contact with the crystalline CoFeX alloy layer and having an in-plane magnetization direction fixed by being pinned to the antiferromagnetic layer;
an electrically conductive spacer layer on the Heusler alloy layer of the multilayer reference layer; and
a free layer on the spacer layer and having an in-plane magnetization direction substantially free to rotate in the presence of an external magnetic field.

10. The head of claim 9 wherein X is Ge.

11. The head of claim 9 wherein the non-Heusler alloy sublayer comprises a layer of an alloy consisting of Co and Fe.

12. The head of claim 9 wherein the layer of Heusler alloy is formed of a material selected from $Co_2MnX$ where X is one or more of Ge, Si, Sn, Ga and Al and $Co_2FeZ$ where Z is one or more of Ge, Si, Al, Sn and Ga.

* * * * *